United States Patent [19]

Ciamaga et al.

[11] Patent Number: 5,419,797
[45] Date of Patent: May 30, 1995

[54] METHOD AND KIT FOR ADHESIVELY BONDING SURFACES

[75] Inventors: Raymond R. Ciamaga, Somerset, N.J.; Joseph A. Pufahl, Locust Valley, N.Y.

[73] Assignee: Adchem Corporation, Westbury, N.Y.

[21] Appl. No.: 190,695

[22] Filed: Feb. 2, 1994

Related U.S. Application Data

[63] Continuation of Ser. No. 947,786, Sep. 18, 1992, abandoned.

[51] Int. Cl.⁶ .................................................. C09J 5/04
[52] U.S. Cl. ........................................ 156/314; 156/191; 156/289; 156/309.3; 156/313; 206/223; 206/225; 273/800; 273/81.5
[58] Field of Search ............... 156/314, 289, 191, 313, 156/309.3; 206/223, 225; 273/80 D, 81.5

[56] References Cited

U.S. PATENT DOCUMENTS

| | | |
|---|---|---|
| 1,781,290 | 11/1930 | Margrave . |
| 2,000,295 | 5/1935 | Oldham . |
| 2,339,121 | 1/1944 | Van Cleef . |
| 2,720,964 | 10/1955 | Hopper ................. 206/223 |
| 3,028,283 | 4/1962 | Lundgren et al. . |
| 3,087,729 | 4/1963 | Sullivan ................. 273/81.5 |
| 3,366,384 | 1/1968 | Lamkin et al. . |
| 3,386,568 | 6/1968 | Harmon ................. 206/225 |
| 3,554,835 | 6/1971 | Morgan ................. 156/289 |
| 3,606,325 | 9/1971 | Lamkin et al. . |
| 3,607,540 | 9/1971 | Hoogstoel ............. 156/289 |
| 3,845,954 | 11/1974 | Case . |
| 3,915,782 | 10/1975 | Davis et al. . |
| 4,174,109 | 11/1979 | Gaiser . |
| 4,185,375 | 1/1980 | Brown . |
| 4,331,736 | 5/1982 | Schäfer et al. ......... 156/289 |
| 4,919,420 | 4/1990 | Sato . |
| 5,034,082 | 7/1991 | Nolan . |
| 5,281,288 | 1/1994 | Murray et al. ......... 156/294 |

*Primary Examiner*—John J. Gallagher
*Attorney, Agent, or Firm*—Dilworth & Barrese

[57] ABSTRACT

A method for adhesively bonding two surfaces, such as a handle grip to a hand-held implement, utilizing essentially non-volatile lubricous oil is provided.

16 Claims, 3 Drawing Sheets

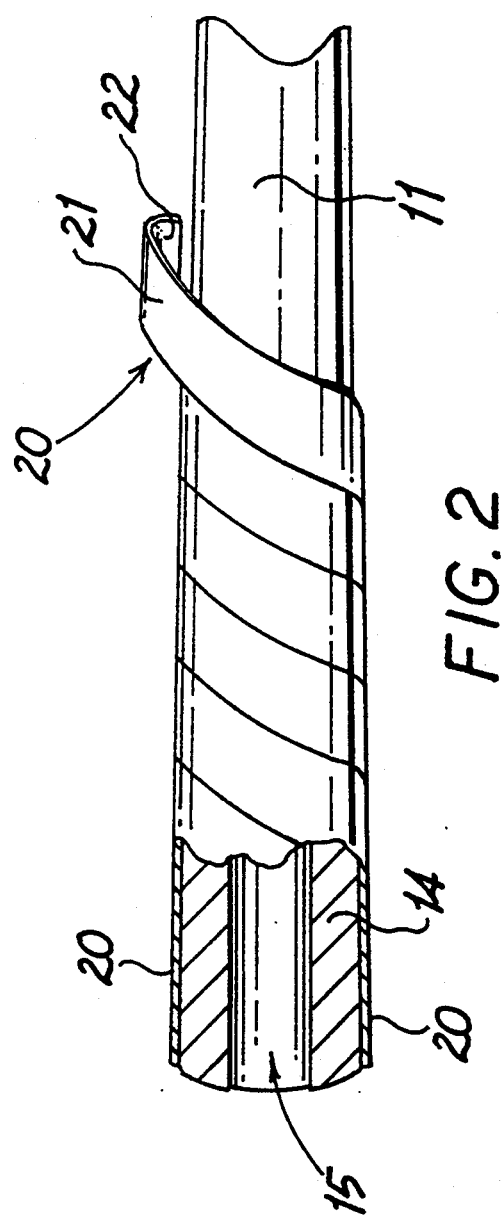
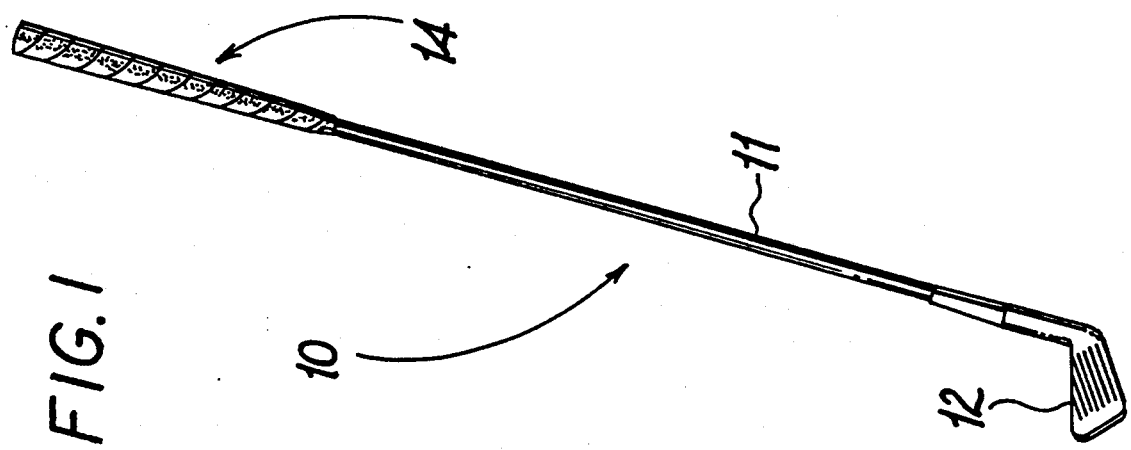

METHOD AND KIT FOR ADHESIVELY BONDING SURFACES

This is a continuation of application Ser. No. 07/947,786 filed on Sep. 18, 1992, now abandoned.

BACKGROUND OF THE INVENTION

1. Field of the Invention

The present invention relates generally to a method and kit for adhesively joining or bonding surfaces and in particular to a method and kit for adhesively applying handle grips to hand-held implements, including sporting equipment, such as golf clubs and tennis rackets, and hand tools and the like.

2. Background of the Art

It is common practice to apply friction or non-slipping handle grip surfaces to the handle portion of hand-held implements to facilitate retention of the implement upon grasping. Such a practice is typically employed, for example, with sporting equipment and hand tools as is illustrated by U.S. Pat. Nos. 1,781,290, 2,000,295, 2,339,121, 3,028,283, 3,087,729, 3,366,384, 3,606,325, 3,845,954, 3,915,782, 4,174,109, 4,185,375, 4,919,420 and 5,034,082. The grip material, which is usually comprised of leather, rubber or the like, provides a degree of shock absorption and a surface with more friction than the wood, metal, composite or plastic shaft upon which it is applied.

Various procedures have been used in the past to apply the handle grip to the respective implement. For example, in the field of golf clubs, it was common practice to wind a strip of grip material around the handle portion of the golf club shaft. Usually the grip material comprised an adhesive on one side to provide bonding to the shaft. However, since winding of the grip material requires much skill and practice, is tedious and extremely time consuming (and oftentimes is unacceptable at the first attempt and must be repeated), in the more recent past, the practice of applying preformed slip-on handle grips has been adopted. While preformed slip-on handle grips are usually employed as original equipment with golf clubs and the like, these grips are also supplied for separate and independent application to replace worn-out grips or to renew or vary the grips in accordance with individual tastes and desires.

In the application of preformed slip-on handle grips however, the problem arises as to how to slide the grip onto an adhesive surface which has been applied to the handle portion of the shaft of the respective implement. One approach has been to employ an adhesive which is activated by a volatile solvent. Thus, for example, such an adhesive is applied to the golf club shaft and a solvent, such as gasoline, is applied to the inner bore of the preformed grip. The solvent acts as a lubricant for sliding the preformed grip onto the shaft and activates the adhesive so that an adhesive bond is formed between the grip and the golf club shaft. Such a method is described in U.S. Pat. No. 3,087,729. Another approach to the problem has been to wrap double-sided pressure sensitive adhesive tape around the handle portion of the shaft and apply a volatile solvent, such as gasoline, toluene, mineral spirits, naphtha, 1,1,1-trichloroethane or the like, to the exposed tacky adhesive surface so as to detackify the adhesive thereby providing a slippery surface over which the grip may be slid. As the solvent evaporates, the tackiness of the adhesive returns and the bond between the shaft and the hand grip is secured.

While these prior methods have been found successful for applying handle grips to hand-held implements, the use of volatile solvents which are often inflammable and/or toxic is highly detrimental to the user as well as to the environment and thus an improved procedure is highly desirable.

SUMMARY OF THE INVENTION

In accordance with the present invention, a novel process and system for adhesively bonding surfaces, which does not employ detrimental solvents, is provided. Generally, the process-of the present invention comprises (i) applying an adhesive surface to a first of said two surfaces to be bonded; (ii) applying an essentially non-volatile lubricous oil to said adhesive surface, wherein said oil is capable of detackifying a tacky adhesive surface or activating a non-tacky adhesive surface and further being capable of being absorbed by said adhesive surface; and (iii) contacting the second of said two surfaces to be bonded with said first surface.

More particularly, the method of the present invention, which is well suited for the application of slip-on handle grips to hand-held implements, comprises (i) applying an adhesive surface to the handle portion of a hand-held implement; (ii) applying an essentially non-volatile, lubricous oil to said adhesive surface, wherein said oil is capable of detackifying a tacky adhesive surface or activating a non-tacky adhesive surface and further capable of being absorbed by said adhesive surface and/or said slip-on handle grip; and (iii) applying said slip-on handle grip to said adhesive surface.

In a further embodiment of the present invention a system or kit for adhesively bonding surfaces, particularly suited for applying a handle grip to a hand-held implement, is provided, the system or kit comprising a) an adhesive means, such as double sided pressure sensitive adhesive tape and (b) an essential non-volatile lubricous oil.

The method of the present invention is particularly suited to the application of handle grips to sporting equipment, such as golf clubs, tennis rackets, and the like.

BRIEF DESCRIPTION OF THE DRAWINGS

FIG. 1 is an elevational view of a golf club having a handle grip applied thereon in accordance with the present invention;

FIG. 2 is a partially cut-away sectional view illustrating the application of double sided pressure sensitive adhesive tape to the handle portion of the shaft of a golf club by spiral wrapping of the tape;

FIG. 3 illustrates the application of double sided pressure sensitive adhesive tape to the handle portion of the shaft of a golf club by tubular wrapping of the tape;

DETAILED DESCRIPTION OF THE PRESENT INVENTION

Figure 4:
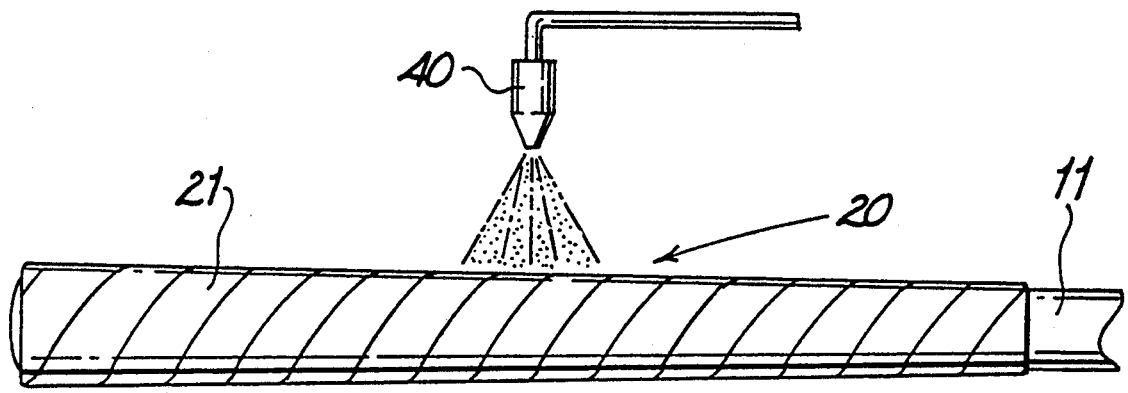
FIG. 4 illustrates the application of oil, by spraying, to the taped handle portion of the golf club shaft.

In accordance with the present invention, it has been surprisingly found that, in contrast to prior practice, a non-volatile lubricous oil can be utilized, instead of the volatile solvents currently employed, as an adhesive detackifier or an adhesive activator in the assembly of slip-on handle grips to hand-held implements. Thus, while the method of the present invention is particularly suitable for the attachment of handle grips to a wide variety of hand-held implements including a wide variety of sporting equipment, one skilled in the art will readily appreciate that the method of the present invention is suitable for adhesively joining or bonding any two surfaces, particularly in applications where sliding movement of one surface relative to the other is necessary such as when joining a sleeve with a cylindrical surface.

Referring to the drawings, the invention is illustrated in connection with the application of a handle grip to a hand-held implement and in particular as applying to a golf club 10 having a metal and/or graphite shaft 11 with an iron or other metal head 12 (although golf clubs having wooden heads or heads made of other conventionally used materials are obviously applicable herein) and handle portion 14. The outer ends of golf club handles are typically tapered to a slight degree increasing in size to the outer end of the club and the slip-on handle grip used in the practice of the present invention is likewise graduated in thickness from the inner to the outer end, i.e., in the same direction as the graduation in size of the golf club handle to which it is applied.

Referring to FIG. 2, in accordance with the present invention, the handle portion 14 of the golf club shaft 11 is spirally wrapped with double-sided pressure sensitive adhesive tape 20 having adhesive surfaces 21 and 22 wherein one side 22 of the tape is adhered to the shaft 11 and the other side 21 provides an exposed adhesive surface. Alternatively, as shown in FIG. 3, the double sided adhesive tape may be cylindrically or tubularly wrapped around the handle portion 14 of the shaft 11.

In accordance with the present invention, after the tape 20 is wound around the handle portion 14 of shaft 11, an oil is applied to the outer adhesive surface 21 of the tape 20 to detackify the surface as shown in FIG. 4. When hollow shafts 11 (as shown in FIGS. 2 and 3) are employed, it is preferred to plug the open end 15 of the shaft to prevent excess oil from dripping into the interior of the shaft. One method for plugging the open end 15 of the shaft would be by using excess tape from the wrapping of the shaft. The oil is applied as a continuous layer in a manner and in an amount sufficient to detackify the adhesive surface 21 and concomitantly provide a surface for sliding the handle grip thereon. The oil may be applied by any method of application known to those skilled in the art, such as, for example, brushing, wiping, dipping, spraying or the like. The preferred method of spraying is illustrated in FIG. 4.

Figure 5:
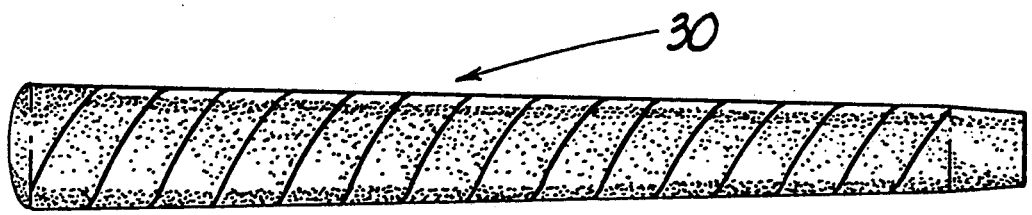
FIG. 5 illustrates a slip-on handle grip suitable for use in the practice of the present invention.
Figure 6:
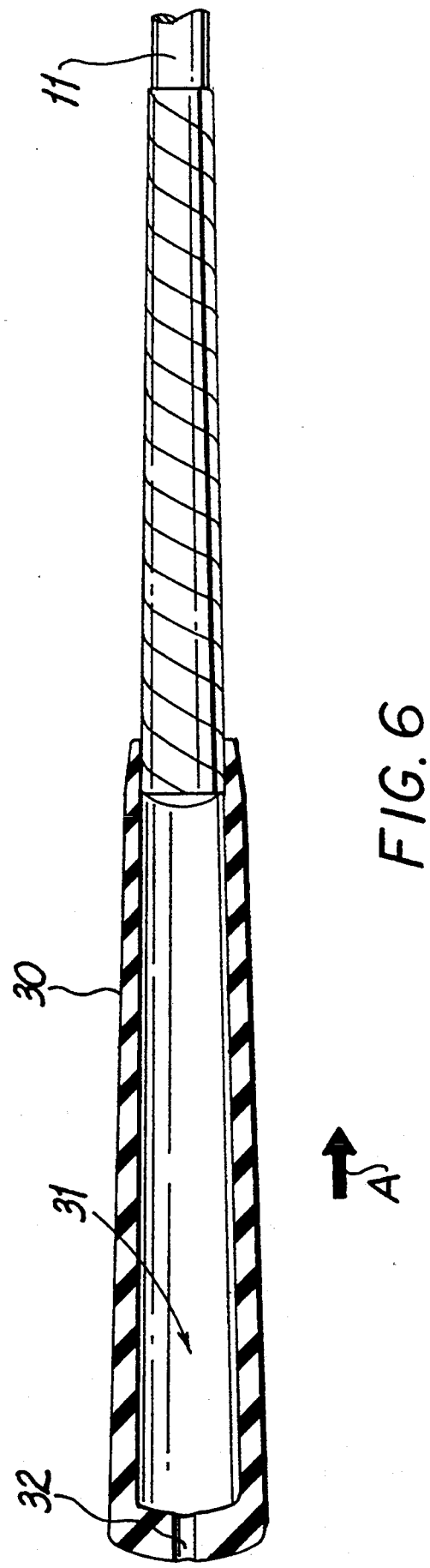
FIG. 6 illustrates the assembly of a slip-on handle grip to the handle portion of the golf club.

Referring to FIGS. 5 and 6, after the oil is applied, the slip-on handle grip 30 is then slid onto the taped end of the shaft 11 in the direction of arrow A as shown in FIG. 6. Handle grip 30 may be fabricated from any conventional material, such as leather, vinyl, rubber and the like. The diameter of bore 31 of handle grip 30 is sized so as to provide a snug fit on the handle end of the shaft 11. Handle grips 30 are often manufactured with an aperture 32. It is preferable to temporarily plug aperture 32 when sliding the handle grip 30 onto the shaft. Plugging the aperture 32 causes entrapped air to bulge the handle grip 30, thereby facilitating the sliding contact of grip 30 with tape surface 21. After the handle grip 30 is applied, the aperture 32 is unplugged, thereby releasing trapped air and oil. Released oil may be collected and reused in accordance with the present process. A period of time is allowed for absorption of the oil into the body of tape 20 and/or grip 30 whereby retackification of the adhesive occurs. A firm bond between the handle grip 30 and the handle end 14 of the shaft 11 is created in from about 2 hours to about 72 hours, depending inter alia, on the absorption rate of the oil, the composition of the adhesive, and the amount of the oil used.

Oils used in the process of the present invention are essentially non-volatile. For the purposes of the present invention "essentially non-volatile" means that, except for minor and insubstantial amounts, the oil does not evaporate under the conditions of its application in the process of the present invention. In accordance with the present process, retackification of the adhesive surface is achieved by absorption of the oil into the adhesive layer 21, and/or body of the tape 20 and/or handle grip 30. Thus, the hazards associated with flammable or noxious fumes are substantially reduced and/or eliminated by the method of the present invention. Furthermore, the oil provides lubrication in conjunction with detackification of the adhesive surface thereby facilitating application of the handle grip.

Oils useful in the practice of the present invention include any lubricous, organic or inorganic substance which is liquid at ambient temperature. Oils suitable for use in the present invention are compatible with the adhesive and/or handle grip material (i.e. the oil is capable of being absorbed by the adhesive and/or tape and/or handle grip) and include hydrocarbon oils (such as paraffinic, aromatic, naphthenic oils and mixtures thereof), saturated and unsaturated organic oils, fatty acid oils and fatty acid ester oils, vegetable and animals oils and other natural oils. Preferred oils in the practice of the present invention not only have a low volatility but also a high flash point. High flash point, as measured by ASTM Standard D92, for example, indicates lower flammability and correspondingly higher safety. Preferred oils have flash points above 200° F. and more preferably above about 250° F. and viscosities in the range of from about 500–5000 centipoise (cps) at 78° F. Oils having a relatively lower viscosity, i.e., viscosity below about 3,000 centipoise (cps) at 78° F. apply more easily and with better uniformity and are therefore most preferred herein. A particularly preferred oil in the practice of the present invention is a mineral oil known as ARCOprime®90, commercially available from Lyondell Petrochemical Company, Dallas, Tex.

A wide variety of adhesive tapes and adhesives are suitable for use in the method of the present invention. Particularly useful adhesive tapes in the practice of the present invention are commercially available double coated paper adhesive tapes commonly known as double sided pressure sensitive adhesive tapes. In particular, double coated paper adhesive tapes useful in the practice of the present invention are available from ADCHEM Corporation of Westbury, N.Y., such as, for example, tape designated as ADCHEM GGT Series. The paper carrier is approximately 3 to 4 mils in thickness and is impregnated on both sides with a high tack synthetic adhesive. The overall thickness of the tape is approximately 6 to 8 mils. Other double-sided pressure sensitive adhesive tapes which have been found useful in the practice of the present invention include 3M Company's #400 Double Coated tape, Anchor brand #591 available from Anchor Continental Company, Tuck brand #403, available from Tesa Tuck, Inc. and Permacel P-02 available from Permacel A Nitto Denko Co.

In an alternative embodiment of the present invention, instead of adhesive tapes, neoprene or isoprene adhesive cements can be employed by applying the same directly to the surface to be bonded, such as, for example, the handle portion of a golf club shaft.

In yet another embodiment of the present invention, the oil may also function as an adhesive activator wherein the oil activates an initially inactive (i.e. non-tacky) adhesive surface. Typically, activatable adhesives usable for this embodiment of the present invention include heat sealable neutral adhesive coatings. In this embodiment of the present invention, the oil may be applied to the inside bore 31 of handle grip 30 and/or the outer tape surface having the neutral adhesive coated thereon. The neutral adhesive is gradually activated (i.e. tackified) by absorption of the oil, the absorption taking enough time to permit assembly of the handle grip 30 onto the handle portion 14 of the shaft.

Figure 7:
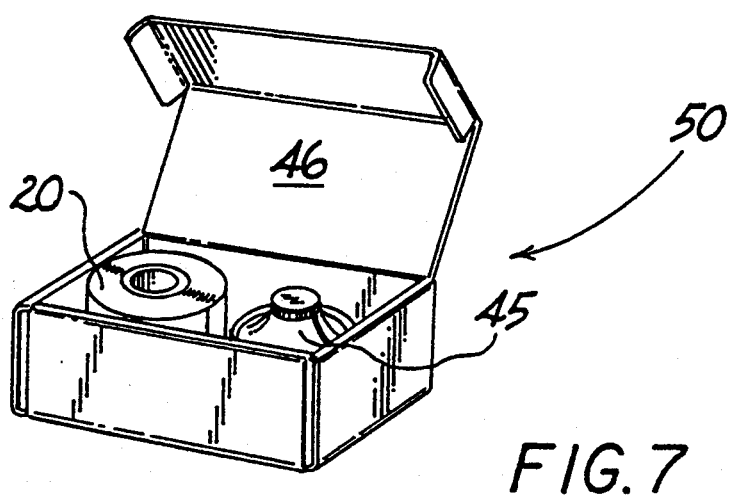
FIG. 7 illustrates a kit useful in the method of the present invention the kit containing double-sided pressure sensitive adhesive tape and an essentially non-volatile lubricous oil.

The present invention is further embodied in the form of a kit 50 as shown in FIG. 7. The contents of kit 50 include an adhesive means such as at least one roll of double sided pressure sensitive adhesive tape 20 and at least one container 45 of essentially non-volatile lubricous oil. The contents of the kit may be conveniently provided in a carton 46 or other packaging means suitable for shipping and storage of the kit. It is also contemplated that the adhesive means (such as the double sided pressure sensitive adhesive tape) and the essentially non-volatile lubricous oil can be independently packaged with directions to be used in accordance with the method of the present invention.

Among the other advantages of the method of the present invention is the ability to reuse the oil. Typically, during assembly of the handle grip onto the shaft, excess oil is pushed ahead by the edge of the handle grip. The excess oil which drips off the shaft 11 can be collected in a container placed below the shaft. The recovered oil may be reused and applied in accordance with the present process thereby making the present process economical and efficient.

The method and system of the present invention is exemplified as follows:

EXAMPLES

The handle end of a standard golf club shaft is wrapped with ADCHEM double sided adhesive tape designated as ADCHEM GGT Series. Oil is then applied to the outer adhesive surface of the tape by brushing or spraying. A handle grip is then slid onto the taped end of the shaft and, after a period of time is allowed to lapse to permit absorption of the oil, the adhesion of the grip to the golf club shaft is manually tested. The ambient temperature is between 65° F. and 85° F. All of the oils listed in Table I provide initial detackification to permit sliding assembly of the grip onto the shaft of the golf club, followed by good adhesion of the grip to the golf club shaft 24 hours after application of the detackifying oil.

TABLE I

| Example | Oil Designation | Oil Type | Volatility[1] | Flash Point[2] | Viscosity[3] |
|---|---|---|---|---|---|
| 1 | Shellflex ® 210 | Paraffinic | 0.9 wt. % | 390° F. | 21 |
| 2 | Shellflex ® 790 | Paraffinic | 0.1 wt. % | 575° F. | 550 |
| 3 | Shellflex ® 371 | Naphthenic | 0.7 wt. % | 420° F. | 80[4] |
| 4 | Shellflex ® 3271 | Naphthenic | 3.6 wt. % | 400° F. | 41 |
| 5 | TUFFLO ® 6016 | Paraffinic | 2.0 wt. % | 385° F. | 18.9 |
| 6 | Shellflex ® 111 | Naphthenic | — | 205° F. | 2.6 |
| 7 | Mazzola ® | Corn Oil | — | — | — |
| 8 | ARCOprime ® 55 | Mineral Oil | — | 275° F. | 8.0 |
| 9 | ARCOprime ® 90 | Mineral Oil | 3.0 wt. % | 365° F. | 15.6[5] |
| 10 |  | Linseed Oil | — | — | — |
| 11 |  | Olive Oil | — | — | — |
| 12 | Sears 5W30 | Motor Oil | — | — | — |

[1]Volatility measured in accordance with ASTM Standard D972 in which the relative amount of tested material which volatilizes at 225° F. after 22 hours is determined.
[2]Flash point as determined in accordance with ASTM Standard D92.
[3]cSt/40° C.
[4]About 3000 cps at 78° F.
[5]About 1000 cps at 78° F.

Shellflex ® oils are available from Shell Oil Corporation. ARCOprime ® and Tufflo ® oils are available from Lyondell Petrochemical Company. Mazzola ® is a commonly available brand of cooking oil. Sears Motor Oil is commonly known and commercially available. Linseed and olive oils are also obviously readily available materials.

While the above description contains many specifics, these specifics should not be construed as limitations on the scope of the invention, but merely as exemplifications of preferred embodiments thereof. Those skilled in the art will envision many other possible variations that are within the scope and spirit of the invention as defined by the claims appended hereto.

What is claimed is:

1. A method for adhesively bonding two surfaces, comprising:
   (i) applying an adhesive to a first of said two surfaces to be bonded;
   (ii) applying a substantially continuous layer of an essentially non-volatile lubricous oil to said adhesive, wherein said oil is capable of detackifying a tacky adhesive surface or activating a non-tacky adhesive surface and further capable of being absorbed by said adhesive; and
   (iii) contacting the second of said two surfaces to be bonded with said first surface.

2. The method of claim 1 wherein said adhesive is provided by applying a double sided adhesive tape to said first surface.

3. The method of claim 1 wherein said essentially non-volatile lubricous oil is selected from the group consisting of hydrocarbon oil, fatty acid oil and fatty acid ester oil.

4. The method of claim 1 wherein said essentially non-volatile lubricous oil is selected from the group consisting of animal oil, vegetable oil, and mineral oil.

5. A method for applying a hand grip to a handle portion of a hand-held implement, comprising:
  i) applying an adhesive to said handle portion of said hand-held implement;
  ii) applying a substantially continuous layer of an essentially non-volatile, lubricous oil to said adhesive to provide a detackified adhesive surface, wherein said oil is capable of detackifying a tacky adhesive surface and is capable of being absorbed by said adhesive and/or by said handle grip;
  iii) applying said handle grip to the detackified adhesive surface by sliding said handle grip onto said handle portion; and
  iv) permitting said oil to be absorbed into said adhesive and/or said handle grip whereby said detackified adhesive surface is retackified.

6. The method of claim 5 wherein said adhesive is provided by applying a double sided adhesive tape to said handle portion of said hand-held implement.

7. The method of claim 5 wherein said essentially non-volatile lubricous oil is selected from the group consisting of hydrocarbon oil, fatty acid oil and fatty acid ester oil.

8. The method of claim 5 wherein said essentially non-volatile lubricous oil has a viscosity below about 3,000 cps at 78° F.

9. The method of claim 5 wherein said essentially non-volatile lubricous oil is selected from the group consisting of vegetable oil, animal oil, and mineral oil.

10. The method of claim 5 wherein said essentially non-volatile lubricous oil is applied by spraying, dipping, brushing or wiping.

11. The method of claim 5 wherein said hand-held implement is a golf club.

12. The method of claim 5 wherein said handle grip is a slip-on handle grip.

13. A method for applying a slip-on handle grip to the handle portion of a golf club, comprising:
  i) applying an adhesive to said handle portion of said golf club;
  ii) applying a substantially continuous layer of an essentially non-volatile lubricous oil to said adhesive to provide a detackified adhesive surface, wherein said oil is capable of detackifying a tacky adhesive surface and is capable of being absorbed by said adhesive and/or said slip-on handle grip;
  iii) applying said slip-on handle grip to the detackified adhesive surface by sliding said slip-on handle grip onto said handle portion of said golf-club; and
  iv) permitting said oil to be absorbed into said adhesive and/or said slip-on handle grip whereby said detackified adhesive surface is retackified.

14. The method of claim 13 wherein said adhesive is provided by applying a double sided adhesive tape to said handle portion of said golf club.

15. The method of claim 13 wherein said handle portion of golf club is constructed of metal or graphite and is substantially non-absorptive to said lubricous oil.

16. The method of claim 13 wherein said lubricous oil is a hydrocarbon oil having a flash point above about 200° F.

* * * * *